Patented June 20, 1950

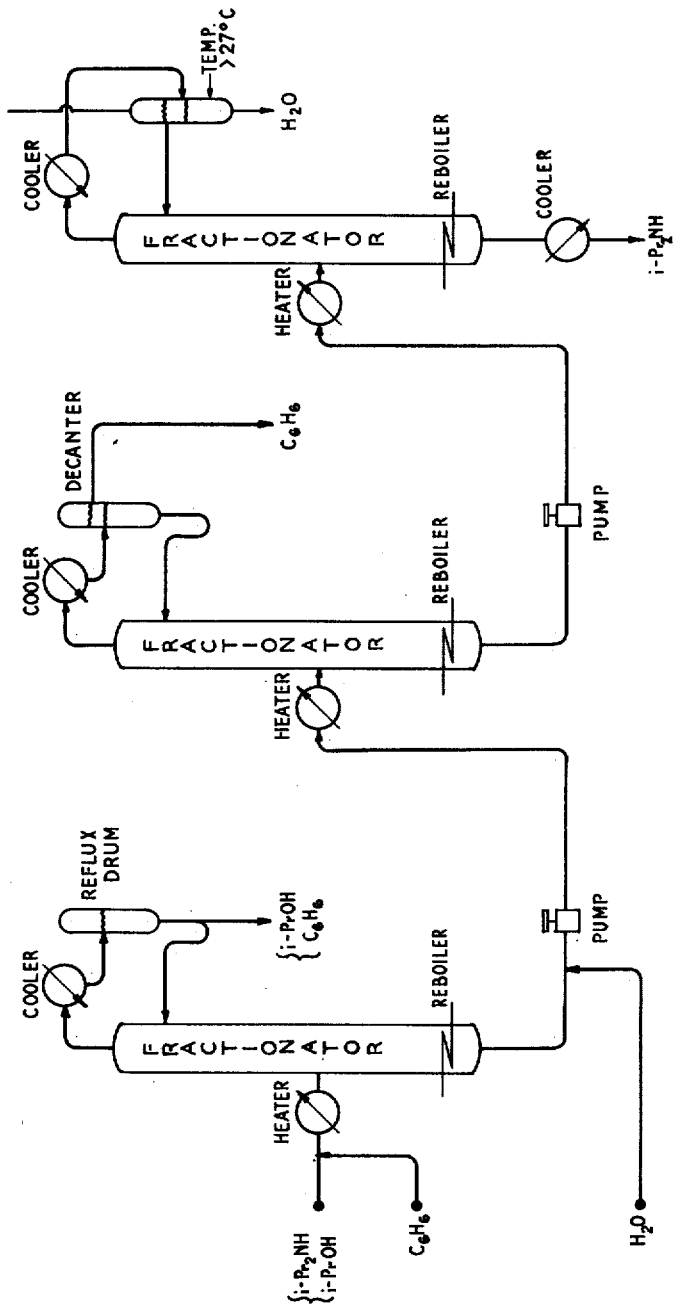

2,512,585

UNITED STATES PATENT OFFICE 2,512,585

AZEOTROPIC DISTILLATION OF ISOPROPYL ALCOHOL FROM DIISOPROPYLAMINE

Everet Foy Smith, Terre Haute, Ind., assignor to Commercial Solvents Corporation, Terre Haute, Ind., a corporation of Maryland Application February 25, 1946, Serial No. 650,133

11 Claims. (Cl. 202—42)

This invention relates to a method for separating diisopropylamine from mixtures comprising diisopropylamine and isopropyl alcohol.

In the production of diisopropylamine by reacting isopropyl alcohol with ammonia, for example, or by hydrogenating a mixture of isopropylamine and acetone, the product always contains an appreciable proportion of isopropyl alcohol. Separation of the diisopropylamine from the isopropyl alcohol cannot be accomplished by direct fractional distillation, owing to the small difference between the boiling points of the two compounds (83.7 and 82.4° C., respectively). Moreover, I have discovered that the prior-art process of distilling the mixture with water to separate the diisopropylamine-water azeotrope boiling at 74.2° C. does not effect a complete separation of the amine from the alcohol, but gives instead a distillate consisting ordinarily of 83% diisopropylamine, 12% water, and 5% isopropyl alcohol. Even when the distillation is carried out in a laboratory under very carefully controlled conditions, I have found that the diisopropylamine - water azeotrope contains around 1% of isopropyl alcohol.

I have now discovered a superior process for isolating diisopropylamine, in which isopropyl alcohol is removed completely from mixtures containing diisopropylamine and isopropyl alcohol by an azeotropic-distillation method comprising the following steps: An inert organic liquid of a type subsequently to be described is added to the mixture of diisopropylamine and isopropyl alcohol; an azeotrope of isopropyl alcohol and the inert organic liquid boiling substantially below isopropyl alcohol (82.4° C.) and diisopropylamine (83.7° C.) is fractionally distilled and removed; the excess inert organic liquid is separated; and the diisopropylamine is subsequently distilled in substantially pure form.

My invention is based on the discovery that the azeotropes of diisopropylamine and certain inert organic liquids, if they exist at all, do not boil appreciably below the boiling points of the inert organic liquids themselves, whereas the inert organic liquids form azeotropes with isopropyl alcohol boiling substantially below the boiling points of the inert organic liquids, isopropyl alcohol, diisopropylamine, and the isopropyl alcohol-diisopropylamine azeotrope. It will be seen that the foregoing boiling-point relationships afford a convenient and effective means for complete removal of isopropyl alcohol from mixtures containing isopropyl alcohol and diisopropylamine, after which the diisopropylamine may be fractionally distilled in substantially pure form.

It will be readily apparent to those skilled in the art that in my process the treatment of the mixture of diisopropylamine and isopropyl alcohol can be continued, additional quantities of the inert organic liquid being introduced into the still if necessary, until tests on the material remaining in the still kettle show that it is entirely free from isopropyl alcohol. The prior-art process, on the other hand, attempts the much more difficult operation of distilling the material directly away from an impurity. In the prior-art process, the quality of the final product is therefore less susceptible to control, since it is directly dependent on the size and type of still column, the distillation rate, and the reflux ratio, and may be greatly affected by any irregularity in the operation of the process.

In one specific embodiment, my invention comprises the following steps:

1. To a mixture containing diisopropylamine and isopropyl alcohol is added an excess of an inert organic liquid capable of forming an azeotrope with isopropyl alcohol boiling substantially below isopropyl alcohol and diisopropylamine.

2. The mixture is distilled through an efficient fractionating column, and the azeotrope of isopropyl alcohol and the inert organic liquid is taken off until all of the isopropyl alcohol has been removed from the still.

3. The residual inert organic liquid is removed, either by direct distillation if its boiling point is sufficiently below that of diisopropylamine, or by azeotropic distillation with a suitable liquid, such as water.

4. Finally, the diisopropylamine is fractionally distilled in substantially pure form.

In carrying out my process, the inert organic liquid is added to the still charge in an excess over the quantity required to form the azeotrope with the isopropyl alcohol present in the still. For example, when benzene is used as the inert organic liquid, the azeotrope contains around 32% isopropyl alcohol. Benzene should therefore be added to the still in a ratio somewhat greater than 2:1 by weight, based on the isopropyl alcohol. The minimum required proportion of other inert organic liquids may be determined similarly from data on their isopropyl alcohol azeotropes disclosed in the prior art.

Removal of the excess inert organic liquid from the still, subsequent to the azeotropic distillation of the isopropyl alcohol, is carried out simply and conveniently by direct fractional distillation if the boiling point of the inert organic liquid is sufficiently below the boiling point of diisopropylamine. Certain inert organic liquids, however, such as benzene, boil so close to diisopropylamine that they cannot be removed in this way, but instead must be removed by adding a suitable azeotrope-former, such as water, and distilling the azeotrope.

Any water remaining in the still after the excess inert organic liquid has been separated may be removed, as described in the prior art, by treatment of the still residue with a dehydrating agent such as sodium hydroxide. I have discovered, however, that in the complete absence of isopropyl alcohol, the diisopropylamine-water azeotrope is heterogeneous at temperatures in excess of 27° C. I have therefore found it convenient to remove the residual water from the still residue by fractionally distilling the diisopropylamine-water azeotrope to a decanter maintained at a temperature above 27° C., refluxing the upper (diisopropylamine) layer, simultaneously withdrawing the lower (aqueous) layer until the distillate becomes homogeneous, and subsequently removing the small quantity of water remaining in the still as an intermediate fraction boiling from 74 to around 82° C.

Numerous inert organic liquids may be used for carrying out the process of my invention and any of these liquids which are capable of forming an azeotrope with isopropyl alcohol boiling substantially below the boiling points of the inert organic liquid, isopropyl alcohol, diisopropyl amine, and the isopropyl alcohol-diisopropyl amine azeotrope are operative in my process. Especially suitable are a number of ethers and straight-chain, branched-chain, and cyclic hydrocarbons. As specific examples of the above classes of inert organic liquids suitable for use in my process may be cited the following: benzene, cyclohexane, n-hexane, 2,2 - dimethylpentane, 2,2,3-trimethylbutane 1-hexene, 2-hexene, 3-hexene, isopropyl ether, butyl methyl ether, ethyl isobutyl ether, butyraldehyde, and ethyl methyl ketone. Esters are definitely unsatisfactory, owing to the fact that they react rapidly with diisopropylamine to form N-substituted amides.

The various distillation steps may be carried out in conventional equipment, such as a still comprising a kettle, a column having plates and bubble-caps in sufficient number to separate fractions boiling within 4–6° C. of each other, a condenser, a decanter arranged to permit reflux of either upper or lower layer to the still column, and one or more receivers of suitable design. The process may be carried out stepwise in batch-type apparatus, or it may be carried out continuously in a series of still columns, each column serving to carry out one step of the process. A suitable arrangement of such equipment is shown in the accompanying diagram. It is understood, however, that this may be modified in various ways and should not be regarded as limiting in character.

The following example is given to illustrate my invention, and is not to be construed as limiting it to the exact materials, steps, or conditions described:

To a batch of crude diisopropylamine comprising 400 parts by weight of diisopropylamine and 26.2 parts of isopropyl alcohol in a still kettle were added 105 parts of benzene, and the mixture was distilled through an efficient fractionating column. A portion of the distillate was refluxed to the still column, and the remainder was withdrawn until the vapor temperature at the top of the column reached 78.3° C., at which point all of the isopropyl alcohol had been removed from the still. During the foregoing procedure, a total of 58 parts by weight of distillate was removed, having the following analysis: 23.6% isopropyl alcohol, 16.7% diisopropylamine, and 58.9% benzene. Fifty parts of distilled water were then added to the still, and the distillation was resumed with the distillate passing into a decanter, from which the water layer was totally refluxed, and the upper layer, containing benzene and diisopropylamine, was taken off up to a vapor temperature of 74° C., at which temperature all of the benzene had been removed. The mixture of benzene and diisopropylamine was recycled in subsequent batches. At 74° C., the distillate, consisting of the diisopropylamine-water azeotrope, was heated in a decanter to a temperature above 27° C. to cause separation into layers, the upper layer was refluxed to the still column, and the lower (water) layer was withdrawn until the distillate became homogeneous. Subsequently, a small wet-diisopropylamine fraction, boiling range 74–82° C., was taken off and held for recycling. Finally the pure diisopropylamine fraction, boiling around 84° C. was distilled. A total of 275 parts of diisopropylamine was separated, analyzing 98.8% pure.

I claim as my invention:

1. A process for separating diisopropylamine from mixtures containing diisopropylamine and isopropyl alcohol which comprises adding to the said mixtures an inert organic liquid capable of forming an azeotrope with isopropyl alcohol boiling substantially below the boiling points of the inert organic liquid, isopropyl alcohol, diisopropylamine, and the isopropyl alcohol-diisopropylamine azeotrope, fractionally distilling and separating an azeotrope comprising isopropyl alcohol and the inert organic liquid, removing the residual inert organic liquid, and fractionally distilling the diisopropylamine.

2. The process of claim 1 in which the residual inert organic liquid is removed by azeotropic distillation with water.

3. A process for separating diisopropylamine from mixtures containing diisopropylamine and isopropyl alcohol which comprises adding to the said mixtures an inert organic liquid capable of forming an azeotrope with isopropyl alcohol boiling substantially below the boiling points of the inert organic liquid, isopropyl alcohol, diisopropylamine, and the isopropyl alcohol-diisopropylamine azeotrope, fractionally distilling and separating an azeotrope comprising isopropyl alcohol and the inert organic liquid, adding water to the still, fractionally distilling the water azeotrope of the inert organic liquid to a decanter, separating the layers of the distillate, refluxing the aqueous layer and simultaneously withdrawing the layer comprising the residual inert organic liquid until all of the inert organic liquid has been removed, separating the residual water from the material remaining in the still kettle, and subsequently fractionally distilling the diisopropylamine in substantially pure state.

4. A process for separating diisopropylamine from mixtures containing diisopropylamine and isopropyl alcohol which comprises adding to the said mixtures an inert organic liquid capable of forming an azeotrope with isopropyl alcohol boiling substantially below the boiling points of the inert organic liquid, isopropyl alcohol, diisopropylamine, and the isopropyl alcohol-diisopropylamine azeotrope, fractionally distilling and separating an azeotrope comprising isopropyl alcohol and the inert organic liquid, adding water to the still, fractionally distilling the water azeotrope of the inert organic liquid to a decanter, separating the layers of the distillate, refluxing the aqueous layer and simultaneously withdrawing the layer comprising the residual inert organic liquid until all of the inert organic liquid has been removed, continuing to distill to a decanter maintained at a temperature of not less than 27° C., separating the layers of the distillate, refluxing the layer comprising diisopropylamine and simultaneously withdrawing the aqueous layer until the distillate becomes homogeneous, removing the residual water as a small intermediate fraction comprising mainly diisopropylamine, and subsequently fractionally distilling the diisopropylamine in substantially pure state.

5. The process of claim 4 in which the inert organic liquid is benzene, and the ratio of benzene to isopropyl alcohol in the original still charge is at least about 2:1 by weight.

6. The process of claim 1 wherein said inert organic liquid is a hydrocarbon.

7. The process of claim 1 wherein said inert organic liquid is an aliphatic ether.

8. The process of claim 1 wherein said inert organic liquid is an aliphatic ketone.

9. The process of claim 6 wherein said hydrocarbon is benzene.

10. The process of claim 6 wherein said hydrocarbon is cyclohexane.

11. The process of claim 7 wherein said aliphatic ether is isopropyl ether.

EVERET FOY SMITH.

REFERENCES CITED

The following references are of record in the file of this patent:

UNITED STATES PATENTS

| Number | Name | Date |
|---|---|---|
| 2,348,683 | McKenna | May 9, 1944 |
| 2,363,157 | Stasse | Nov. 21, 1944 |
| 2,363,158 | Stasse | Nov. 21, 1944 |
| 2,363,159 | Stasse | Nov. 21, 1944 |